United States Patent [19]

Campbell, Jr.

[11] 3,941,160
[45] Mar. 2, 1976

[54] INTERLOCKING CERAMIC TILE FOR COVERING AN INSULATED WATER COOLED PIPE STRUCTURE

[75] Inventor: Frank Campbell, Jr., North Augusta, S.C.

[73] Assignee: The Babcock & Wilcox Company, New York, N.Y.

[22] Filed: Feb. 8, 1974

[21] Appl. No.: 440,900

[52] U.S. Cl. ............... 138/178; 138/149; 138/155
[51] Int. Cl.² .................... F16L 9/10; F16L 9/22
[58] Field of Search .......... 138/149, 178, 175, 155; 110/98, 98 R; 432/149

[56] References Cited
UNITED STATES PATENTS

| | | | |
|---|---|---|---|
| 1,969,374 | 8/1934 | Kleffel | 138/149 |
| 2,884,879 | 5/1959 | Corriston | 110/98 R |
| 3,055,651 | 9/1962 | McCullough | 138;110/147;98 R |
| 3,226,101 | 12/1965 | Balaz et al. | 432/234 |
| 3,451,661 | 6/1969 | Barker | 138/149 |
| 3,486,533 | 12/1969 | Doherty et al. | 432/234 X |
| 3,488,040 | 1/1970 | Dickson | 138/149 X |
| 3,820,947 | 6/1974 | Boto et al. | 138/149 X |

Primary Examiner—Houston S. Bell, Jr.
Assistant Examiner—James E. Bryant, III
Attorney, Agent, or Firm—J. M. Maguire

[57] ABSTRACT

The invention relates to a preburned ceramic refractory covering for a water cooled metallic pipe forming a structural portion of a furnace. The pipe is covered by a layer of fibrous insulating material where the refractory covering is formed by interlocking shapes which are interlocked and maintained in assembled position by pins welded to the pipe and positioned along edge surfaces of the shapes.

4 Claims, 7 Drawing Figures

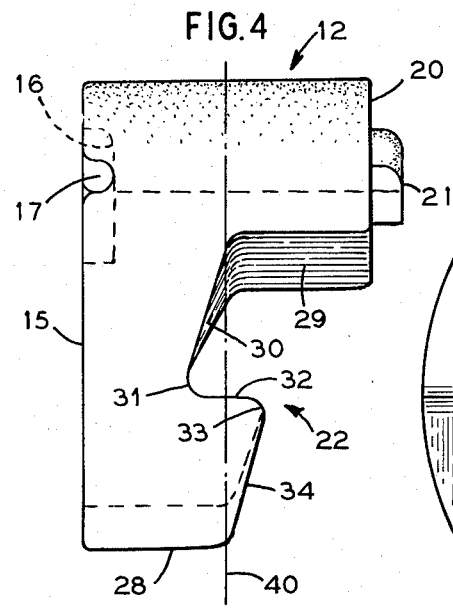
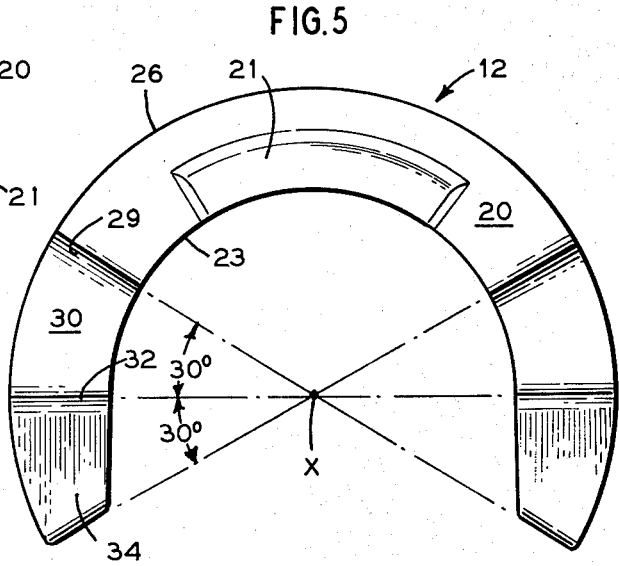
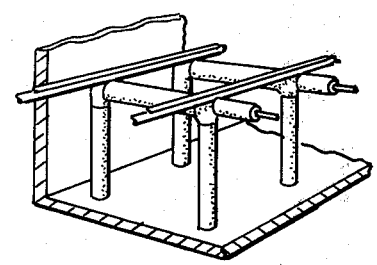
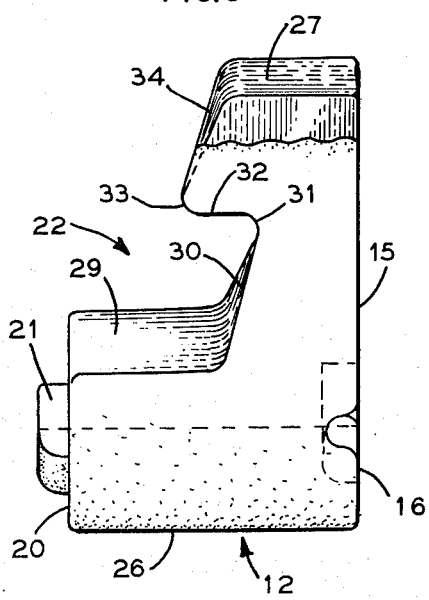
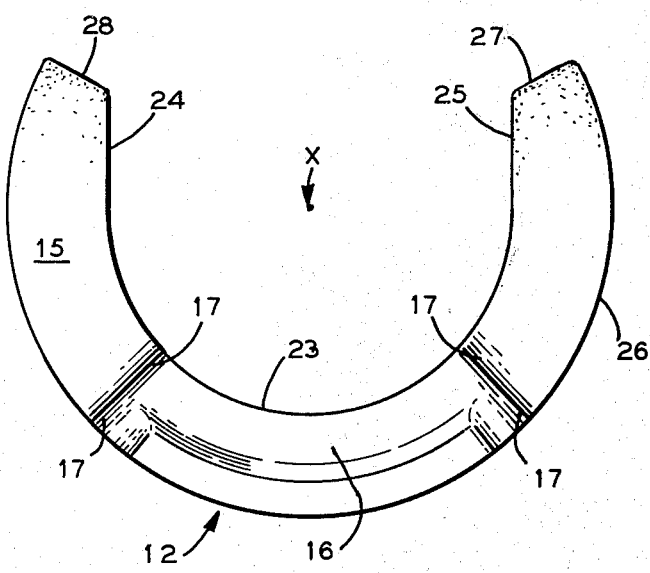

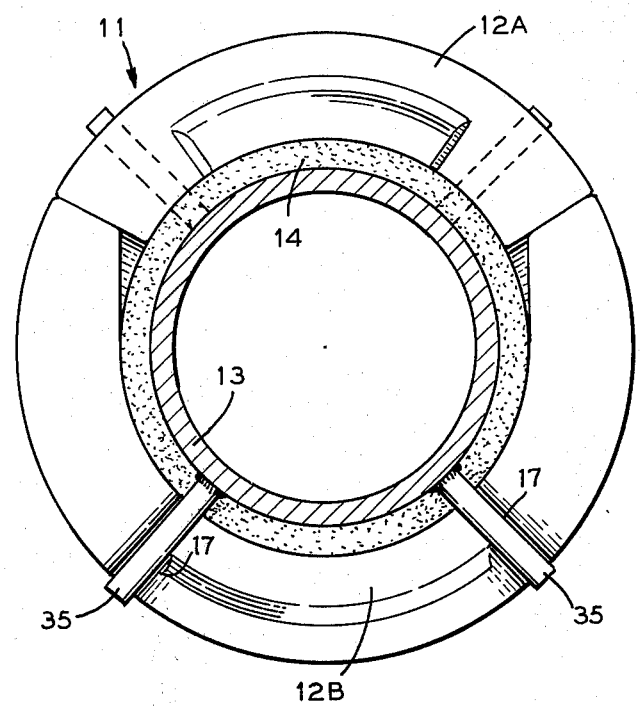
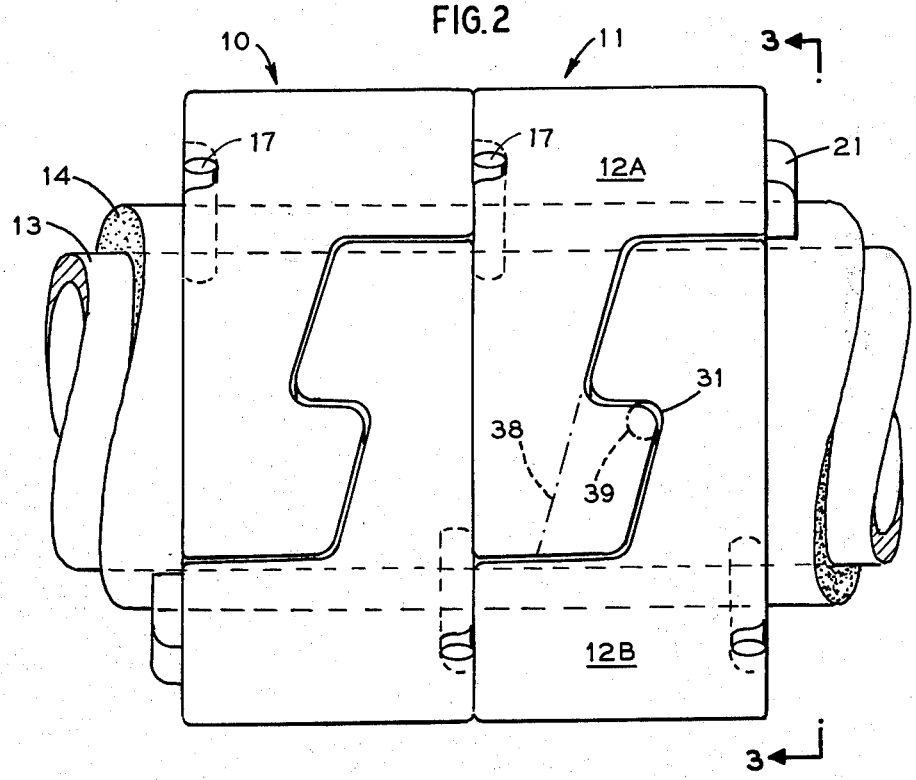

INTERLOCKING CERAMIC TILE FOR COVERING AN INSULATED WATER COOLED PIPE STRUCTURE

The present invention relates to ceramic refractory elements for protecting and insulating the water cooled pipes utilized as a support structure in furnaces.

In metallurgical furnaces of the type in which metal reheat occurs prior to further working of the metal, the structure supporting the metal pieces being so reheated usually involves the use of water cooled pipes as structural support members. For many years it has been known that such water cooled pipes should be insulated and protected to extend the life of the parts, but more importantly to reduce heat losses from the furnace through flow of the cooling fluid through the structural support pipes.

One of the most satisfactory forms of protective and insulating covers for such water cooled pipes includes a layer of insulating material positioned adjacent the exterior surface of the water cooled pipe with the insulating material enclosed in an outer layer of preburned ceramic refractory tile.

The tile covering is required to protect the insulating material, which will ordinarily not have sufficient chemical or thermal resistance to furnace conditions to permit long term use. Necessarily, the tile must be segmental not only for ease of installation, but also to provide for thermal expansion and contraction in the ceramic and between the ceramic and the metal of the pipes, during furnace operations.

In the present invention, I have found that when properly constructed the ceramic refractory tile covering for the water cooled pipes may be made in a simplified shape where the great majority of such tiles are uniform in their configuration and, furthermore, that such tiles can be made of considerably less thickness, and thus less weight, than the tiles heretofore in use.

This desirable configuration can be used advantageously due to the use of an interlock between a pair of shapes forming a ring or circumferential unit of the pipe covering. Each circumferential unit is self-supporting when positioned on either a horizontally or vertically oriented pipe support structure. Adjacent circumferential units are also interlocked by a ship-lap interconnection to avoid relative rotational movement between assembled units and each unit is further provided with radial slots to permit use of high temperature alloy metal studs welded to the external surface of the enclosed pipe so as to ensure proper positioning of the protective ceramic assembly. The studs further reduce possible loss of adjacent shapes of the total assembly in the event any individual shape is damaged through physical abuse or failure.

FIG. 1 is a perspective view of a portion of a furnace including water cooled pipe structure which are protected by the refractory of the present invention;

FIG. 2 is a top view of the ceramic refractory tile of the present invention assembled on a water cooled pipe;

FIG. 3 is an end view of FIG. 1 taken along line 3—3 with the top of the assembly shown to the left on the drawing;

FIG. 4 is a side view of an individual ceramic refractory tile;

FIG. 5 is an end view of the tile shown in FIG. 4;

FIG. 6 is a side view of a ceramic refractory tile moved through 180° of its installed position with respect to the FIG. 4 showing; and FIG. 7 is an end view of the tile shown in FIG. 6.

The furnaces in which the present invention is useable are well known in the art as shown in FIG. 1 and illustrated in the J. D. McCullogh U.S. Pat. No. 3,055,651. Ordinarily, the ceramic refractory tile of the present invention is particularly applicable to horizontal and vertical runs of water cooled pipe. As hereinafter more thoroughly described, the same general concept of segmental tiles or shapes can be used where one pipe is to be covered or whether two pipes arranged in closely spaced parallel relationship need to be covered by insulation and tile protection.

Referring to the drawings, FIG. 2 shows the assembled structure illustrating two adjacent circular units 10 and 11, each unit of which is formed by two interlocked elements or shapes 12A and 12B that form a complete circumference protection unit or ring around a pipe 13. As shown in both FIGS. 2 and 3 the ceramic shapes 12 are formed with internal dimensions somewhat larger than the external dimension of the pipe 13 to be covered. A layer of insulating material 14 is positioned between the ceramic refractory tile and the pipe 13. In the embodiment shown, the fibrous material is advantageously in the form of a blanket wrapped around the pipe upon installation and is held in place by adhesive strips (not shown). Thereafter, the ceramic refractory shapes are installed concentrically on the fibrous blanket layer so that the arrangement allow the entire structure to expand and contract without refractory fracture during temperature fluctuations during furnace operation.

The furnace may be operated at a temperature above 2,500°F while the water temperatures may be only several hundred degrees, depending upon cooling water flow rates through the pipe. Under these circumstances the exterior surface of the refractory tiles, or shapes 12 due to their higher temperature environment, will tend to expand a greater amount than the expansion of the metallic pipe. As hereinafter described in greater detail, the tiles are installed with adequate expansion provisions so as to avoid crushing of the refractory material due to the inherent expansion of such tiles in the assembly.

One of the particular advantages of the ceramic shapes illustrated relates to the use of identical elements or shapes 12 throughout the assembly in coverage of a uniform diameter pipe.

In the protecting pipes or tubes of different external diameters different sizes of ceramic refractory tile must be used, but the configuration of the tile will be the same in the different sizes even though diameters may be different.

As shown particularly in FIGS. 2 and 3, each unit or element 10 or 11, is formed of two shapes 12A and 12B where the assembly forms an annulus with generally cylindrical inner and outer surfaces, and a generally uniform wall thickness. The edge surfaces of the element are generally parallel and perpendicular to the axis of the pipe 13. As shown, the interlocking portions of the shapes 12A and 12B are somewhat loose fitting to permit expansion and contraction of the shapes while maintaining the integrity of the element. With particular reference to FIGS. 4–7, the configuration and details of an individual ceramic refractory shape 12 are illustrated. Each tile or shape 12 is formed by classical methods of refractory manufacture such as by pressing, casting, ramming or the like. As shown particularly in FIGS. 6 and 7, one edge surface 15 of the shape is substantially flat and is provided with an arcuate recess 16 and a pair of radially extending grooves 17 which are spaced on the opposite ends of the arcuate recess 16.

The opposite edge surface 20 of the shape 12 is limited in its flat surface and is provided with an arcuate protuberence 21 which matches in location and shape, but is provided with somewhat smaller dimensions than the dimensions of the recess 16 in the edge 15. When adjacent rings or circumferential units are assembled the protuberence of one shape will loosely fit in a recess of an adjacent shape. The loose fit is desirable to accommodate thermal movements of the shapes and any physical movements of the pipe support structure. In addition, as shown, the edge surface 20 of the shape is formed with an internal identation in the shape of a modified "S" to provide an interlocking surface, as hereinafter described.

The inner surface 23 of the shape 12 is a semi-cylinder, formed about an axis X, and is provided with symmetrically extending parallel arms 24 and 25 of equal length, which merge into and extend beyond the opposite ends of the semi-cylindrical inner surface 23. The outer surface 26 of the shape is of cylindrical configuration coaxial with the semi-cylindrical inner surface 23 and cooperating with the inner surface arm extensions to form the arms on the open end of each shape. The ends 27 and 28 connecting the inner and outer surfaces are radial with respect to the common axis of the shape.

The face edge surface 20 of the shape 12 is indented at each end to form a hook-like configuration 22 which is of the general configuration of a modified S shape. Specifically, the shape 12 is indented as at 29 in a radial direction from the edge 20, approximately one half the distance through the thickness of the shape. (i.e. between faces 15 and 20) The surface is thereafter inclined at 30 toward the edge 15 of the shape to a mid position 31 wherein the reentrant surface 32 is formed extending outwardly of the shape. The reentrant surface 32 lies in a radial plane with respect to the axis of the shape and extends to a curved end 33 from which the surface is again inclined as at 34 toward face 15 of the shape to the end 28 of the arm 24. Essentially, the two inclined surfaces 30 and 34 are parallel and the structure forms a symmetrical hook-like configuration 22.

It will be noted that FIGS. 4 and 5 illustrate the shape as viewed from the opposite side of the view shown in FIGS. 6 and 7, and due to the symmetrical arrangement of each shape 12 a pair of identical shapes such as 12A and 12B (FIG. 2) may be joined to form a circumference enclosure for the pipe such as shown at 10 or 11 in FIG. 2. In assembly of the two pieces or shapes the circumference enclosing ring surrounding the pipe forms a collar having essentially parallel edge surfaces. To provide for expansion and contraction of the ceramic refractory members there is ordinarily approximately 1/16 of an inch clearance in the parts even though the adjoining surfaces may abut at some part of their configuration as caused by the weight of each shape 12.

With each segment of the complete enclosure ring formed from identical parts, the radial grooves 17 on the substantially flat face 15 of each shape 12 may be fixed in position by the use of a welded stud 35 which is positioned and welded after the ceramic shapes are joined. The use of the metallic studs aids in maintaining the positional relationship of the rings and also prevents rotation of individual shapes in case of the failure of another shape. Such failure might occur due to physical damage by accidental striking of the ceramic shapes from the metallic parts being heated in the furnace enclosing the water cooled pipe structure.

In the embodiment of the invention shown in the drawings, the pipe 13 is approximately 4½ inches in outside diameter, and the internal diameter of the ceramic refractory shape 12 is approximately 5½ inches. Thus, the radial dimension between the axis X and the surface 23 is 2¾ inches. The wall thickness of the shape 12 is approximately 1½ inches (from surface 23 to surface 26), and the length of the shape parallel to the axis X is approximately 4½ inches. It will be understood these dimensions are merely illustrative of a practical shape 12, such as those successfully employed in the present use, and other dimensions can be used.

In the embodiment shown the S shaped hook formed with in the indentation 22 extends through an angle of 60° on each end of each shape 12 including each arm 24 and 25. This is illustrated in FIG. 5, where the angle between the radial planes of surfaces 29 and 32 is 30 degrees, and between surfaces 28 and 32 is also 30 degrees about the axis X. In addition, a median plane 40 (see FIG. 4) between edges 15 and 20 would intersect the curved ends between surfaces 29 and 30, and surfaces 28 and 34. Such a plane would also pass through the mid-point of the surface 32.

In the installation of the protective and insulating arrangement disclosed, the interlocked joints 22 of the pair of shapes 12 forming a cylindrical element or unit, such as 10 or 11 shown in FIG. 2, preferably will be positioned on the top and bottom of the pipe as shown. In this arrangement the upper joint will be in tension and the lower joint will be in compression. These forces will be minimal and the ceramic being stronger in compression the overall arrangement will be able to withstand service requirements. Alternately, it is possible to move the joint location on initial installation, and locate the joints on the side of the pipe. Under such conditions the joints will be in tension from the weight of the shapes 12.

In installing the preburned ceramic refractory shapes 12 of the invention on the layer of insulation 14 the first ring or unit is usually positioned adjacent the joint between a vertical and horizontal pipe support structure. The shapes 12A and 12B, which are identical in overall configuration are interlocked by the matching S shaped hooks, and the studs 35 are welded to the pipe 13 after the shapes are positioned. Thereafter the next pair of shapes forming a ring or unit is interlocked and positioned loosely adjacent the first ring in shiplap locking relationship by engaging the adjacent annular recesses 16 with a companion arcuate protuberance 21. As hereinbefore pointed out, it is desirable to maintain approximately 1/16 inch clearance between adjacent rings or circumferential units to permit thermal expansion between the units. Successive rings are installed as described to cover the insulation for the length of the pipe being protected. Each ring may be locked in position on the pipe by welding the studs 35 along the edge surfaces thereof as each ring is positioned on the pipe. However, it has been found in practice that only every third or fourth ring actually requires the use of the welded studs to maintain the integrity of the assembly in normal furnace operations. The opposite ends of the ceramic refractory covering is ordinarily closed, and the insulation covering of the pipe joint are protected by a layer of initially plastic refractory materials.

It will be understood that in the event one or more of the shapes 12 are physically damaged by being struck by a billet being heated in the furnace the assembly may be repaired without removing undamaged rings or circumferential units of the assembly. This may be accomplished by the use of precast shapes 12' or by cutting one on more shapes 12 in the field. This can be accomplished by removing the protuberances 21 on a pair of shapes 12 in a ring, and by removing the S shaped hook on one of the shapes 12. This is indicated by dotted line 38 in shape 12A, shown in FIG. 2. Additionally when shape 12B is positioned on the pipe a radial stud will be welded to the pipe near curve 31 as indicated in dotted lines at 39 in FIG. 2. In such an arrangement the hook joints between the pair of shapes will be located on the sides of the pipe structure.

In the event a pair of parallel pipes are arranged in adjoining relationship as required for furnace structure support purposes, similar shapes, such as the shapes 12, may be constructed with the arms 24 and 25 extended as required. The same S shaped joints can still be utilized to interconnect a pair of such shapes.

The embodiments of the invention in which an exclusive property or privilege is claimed are defined as follows:

1. A preburned ceramic refractory shape formed as a segment of ring-like configuration having substantially parallel edge surfaces, one of the edge surfaces having an arcuate protuberance thereon and the opposite edge surface having an annular recess therein symmetrically arranged with respect to the protuberance, a semi-cylindrical inner surface substantially perpendicular to the edge surfaces and having parallel arms extending beyond and with their inner surfaces merging with the inner surface of the shape, an external segment of a cylindrical surface co-axial with and spaced outwardly of the inner semi-cylindrical surface and the surface extended to define an exterior surface of the arms, one of the edge surfaces of the shape being substantially flat throughout its extent including the arms, the other edge surface having symmetrical recessed portions including each arm extending through the shape, each recessed portion including a hook therein, some of the surfaces of the recessed portion lying in radial planes passing through a common axis of the inner and outer curved surfaces.

2. A preburned ceramic refractory shape according to claim 1 wherein the substantially flat surface of the shape is provided with an annular recess therein adjacent the semi-cylindrical inner surface, the recess being symmetrical with respect to the arm extensions of the shape.

3. A preburned ceramic refractory shape according to claim 1 wherein the recessed portion of the other edge surface includes a modified S shaped hook.

4. A preburned ceramic refractory shape according to claim 2 wherein the volume of the recessed portion is substantially equal to the volume of the hook.

* * * * *